US006249717B1

(12) United States Patent
Nicholson et al.

(10) Patent No.: US 6,249,717 B1
(45) Date of Patent: Jun. 19, 2001

(54) LIQUID MEDICATION DISPENSER APPARATUS

(75) Inventors: Laurence R. Nicholson; Cliff Tyner; Debra L. McEnroe, all of Grass Valley; Robert A. Britts, Nevada City; Philippe Pouletty, Woodside; Ralph Levy, Pleasanton, all of CA (US)

(73) Assignee: SangStat Medical Corporation, Fremont, CA (US)

( * ) Notice: Subject to any disclaimer, the term of this patent is extended or adjusted under 35 U.S.C. 154(b) by 0 days.

(21) Appl. No.: 08/867,010

(22) Filed: Jun. 2, 1997

Related U.S. Application Data

(60) Provisional application No. 60/030,641, filed on Nov. 8, 1996.

(51) Int. Cl.[7] ...................................................... G06F 17/00

(52) U.S. Cl. .......................... 700/241; 700/244; 700/236; 222/246; 368/10

(58) Field of Search ............................ 364/479.14, 479.1, 364/479.06, 479.03, 479.01, 479.02, 479.07; 222/644, 642, 39, 30, 638, 639, 36, 37, 71, 246; 22/2; 221/7; 700/29 C, 236, 244, 241; 368/10

(56) References Cited

U.S. PATENT DOCUMENTS 4,034,757 7/1977 Glover .................................. 222/30
4,276,999 * 7/1981 Reichenberger .................. 364/479.1
4,442,953 * 4/1984 Miyamoto et al. ............... 364/479.1
4,473,884 9/1984 Behl ................................ 364/479.12
4,588,303 * 5/1986 Wirtschafter et al. ................. 368/10
4,616,316 * 10/1986 Hanpeter et al. ............... 364/479.14
4,619,653 * 10/1986 Fischell ................................ 604/891
4,674,652 * 6/1987 Aten et al. ................................ 221/3
4,695,954 * 9/1987 Rose et al. ...................... 364/479.14
4,725,997 2/1988 Urquhart et al. ...................... 368/10
4,736,871 * 4/1988 Luciani et al. ......................... 222/30
4,784,645 * 11/1988 Fischell ................................ 604/153

(List continued on next page.)

FOREIGN PATENT DOCUMENTS 0 298 627 1/1989 (EP) .
0 533 300 A1 3/1993 (EP) .
533300A1 * 3/1993 (EP) ................................ 364/479.01
WO 86/06048 10/1986 (WO) .
WO 93/20486 10/1993 (WO) .

OTHER PUBLICATIONS

FDA Approval Report on CycloTech, Aug. 1998.*
Sangstad Medical Corporation Reorts Second Quarter Results, Business Wire, Aug. 1999.*
Abott Laboratories Completes Equity Invenstment in Sang Star, Business Wire, Aug. 1999.*
Cyclosporine Oral Solution Dispenser Gains FDA Acceptance, Medical Data International, Aug. 1998.*

*Primary Examiner*—Christopher P. Ellis
*Assistant Examiner*—Michael E. Butler
(74) *Attorney, Agent, or Firm*—Flehr Hohbach Test Albritton & Herbert LLP

(57) ABSTRACT

A liquid medication dispenser apparatus which provides for user-friendly medication measurement and compliance. The apparatus measures and dispenses liquid medication doses and records the time and dose sizes for up to one year. The recorded information can then be downloaded to a personal computer for evaluation of patient compliance. A disposable, motor driven pump is used to provide a very wide range of medication dispensation volumes, while maintaining full accuracy and reducing the risks of patient errors as might occur with a manual dispense system.

20 Claims, 8 Drawing Sheets

U.S. PATENT DOCUMENTS

| | | | | |
|---|---|---|---|---|
| 4,792,449 | | 12/1988 | Ausman et al. | 424/440 |
| 4,953,745 | | 9/1990 | Rowlett, Jr. | 221/5 |
| 5,088,056 | * | 2/1992 | McIntosh et al. | 364/569 |
| 5,108,889 | * | 4/1992 | Smith | 435/4 |
| 5,246,136 | | 9/1993 | Loidl | 221/3 |
| 5,292,029 | | 3/1994 | Pearson | 221/2 |
| 5,347,453 | * | 9/1994 | Maestre | 364/413 |
| 5,377,864 | | 1/1995 | Blechl et al. | 221/2 |
| 5,389,382 | * | 2/1995 | List et al. | 604/500 |
| 5,405,616 | * | 4/1995 | Wunderlich et al. | 424/451 |
| 5,431,299 | | 7/1995 | Brewer et al. | 221/2 |
| 5,490,610 | | 2/1996 | Pearson | 221/2 |
| 5,496,360 | * | 3/1996 | Hoffman et al. | 607/120 |
| 5,646,912 | * | 7/1997 | Gousin | 368/10 |
| 5,695,091 | * | 12/1997 | Winings et al. | 222/39 |
| 5,703,786 | * | 12/1997 | Conkright | 364/479.07 |
| 5,724,021 | * | 3/1998 | Perrone | 340/309.15 |
| 5,751,661 | * | 5/1998 | Walters | 368/10 |
| 5,764,522 | * | 6/1998 | Shalev | 364/479.1 |
| 5,772,074 | * | 6/1998 | Dial et al. | 222/37 |
| 5,876,754 | * | 3/1999 | Wunderlich et al. | 424/489 |
| 6,018,289 | * | 1/2000 | Sekura et al. | 340/309.4 |
| 6,021,918 | * | 2/2000 | Dumont et al. | 221/2 |

* cited by examiner

LIQUID MEDICATION DISPENSER APPARATUS

CROSS-REFERENCE TO RELATED APPLICATIONS

This application claims priority from U.S. provisional application serial No. 60/030,641 filed on Nov. 8, 1996, entitled "Liquid Medication Dispenser Apparatus," which is incorporated by reference herein in its entirety.

BACKGROUND OF THE INVENTION

1. Field of the Invention

This invention pertains generally to devices and methods for dispensing medication, and more particularly to a liquid medication dispenser apparatus that monitors compliance with a treatment plan and determines a compliance score indicative of whether the liquid medication was dispensed at predetermined times and at predetermined dose levels.

2. Description of the Background Art

Medication recipients frequently need to take a set dose of medication or medications at regular intervals of time. Failure by persons to take the required medication dosages at the appropriate time intervals results in incorrect blood serum levels of the medication, and can ultimately lead to unfavorable clinical outcomes. For several reasons, incorrect liquid medication dosages are often taken by patients. Liquid medication dosages are typically measured by pouring the medication into a tea spoon or small container prior to taking the medication. This manner of dosage measurement is prone to inaccuracy and can result in wasted medication and unpleasant messes due to spills during measurement. Further, the amount of liquid medication remaining in a container cannot be easily determined, unlike solid medications wherein the patient can count the number of pills present, and thus the patient can run out of medication, resulting in missed or skipped medication dosages. Additionally, patients who must take numerous medications on a regular basis can easily loose track of the time at which a particular medication was most recently taken, resulting in omission by the patient of required dosages or exceeding the dosage requirement. Frequently, the timing requirements vary for dosages of different medications and further lead to patient confusion and error in taking the different medications at correct time intervals.

Accordingly, there is a need for a liquid medication dispenser which alerts patients of the correct time intervals for taking liquid medications, which keeps track of and displays the number of dosages of liquid medication taken, and which quickly, consistently and accurately measures and dispenses dosages of liquid medication. The present invention satisfies these needs, as well as others, and generally overcomes the deficiencies found in the background art.

BRIEF SUMMARY OF THE INVENTION

The present invention pertains to a liquid medication dispenser that monitors treatment compliance. It is designed to be extremely convenient and easy to use by the patient, while still providing state-of-the-art features for the health care provider. It measures and dispenses liquid medication doses, recording the time and sizes of doses, as well as information pertaining to compliance with a programmed treatment plan, for up to one year or longer. The device can be programmed, and information retrieved from the device, using a personal computer. Information downloaded from the device can then be used to evaluate patient compliance with the programmed treatment plan. The device utilizes a disposable, motor driven pump and medication reservoir to provide a very wide range of volumes, while maintaining full accuracy and reducing the risks of patient errors as might occur with a manual dispensing system.

In general terms, the invention comprises a medication cassette with an interchangeable and disposable reservoir and fluid path assembly, means for adjusting the amount of medication delivered, timer means for measuring time, memory means for storing data, display means for providing visual and audio output to a user, and control processor means for monitoring and recording the time and number of medication dosages dispensed, for alerting the user of the time for taking medication dosages, for monitoring he amount of medication remaining in the medication cassette, and for computing a compliance score. Preferably audible alarm means for alerting a user, and a communications interface for linking the control processor means with an external computer, are also included with the invention. A liquid dispensing valve assembly and pump are used for dispensing liquid medication from the reservoir and through the fluid path assembly.

By way of example, and not of limitation, the control processor means preferably comprises a conventional microprocessor, or other programmable data processor, which may be in digital or analog format. The timer means comprises first and second timers interfaced with the microprocessor, with the first timer preferably comprising a 32 KHz timing circuit for real time monitoring by the microprocessor, and the second timer preferably comprising a 4 MHz clock for basic processing by the microprocessor. The microprocessor may additionally include an internal "watchdog" timer. The display means preferably comprises a multi-field liquid crystal display (LCD) or light emitting diode (LED) display operatively connected to the microprocessor. The audio alarm means preferably comprises a conventional piezoelectric watch alarm device, and is operatively coupled to the microprocessor. The liquid dispensing pump has a pump motor with a rotation sensor associated with the rotating shaft of the motor. The rotation sensor is preferably an optical rotation encoder and is operatively coupled to the microprocessor to allow monitoring of medication dispensing events. The memory means preferably comprises at least 2K of random access memory (RAM) which is accessible by the microprocessor. The communications interface preferably comprises an optical interface operatively coupled to the microprocessor, and which receives an interface cable for connection to a personal computer.

It is an object of the invention to provide a liquid medication dispensing apparatus which uses standard 50 ml medication bottles, has a disposable fluid path fully enclosed in the dispenser's plastic case for easy carrying, has a 0.1 ml to 5 ml dose range, has 0.1 ml resolution, exhibits high accuracy at 5 ml, has only two user keys—a Display/Dose key and an Alarm/Increment key, employs a liquid crystal display (LCD), has at least one year memory at 2 doses per day (uploadable to a personal computer), has at least several months of battery life, uses common "AA" type alkaline batteries for power, and uses a pump technology for wide volume range and less patient error.

The invention provides for dispensing a measured dose of a liquid therapeutic drug to a patient and records the timing and amount of dose dispensed. The dose and/or timing history can be reviewed by a patient, physician or other health care provide, either as raw data or as a calculated "compliance score." The invention is particularly suited for dispensing a liquid immunosuppressive drug to a transplant patient, and can be adapted for dispensing multiple drugs.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 10. It will be appreciated that the apparatus may vary as to configuration and as to details of the parts without departing from the basic concepts as disclosed herein.

Figure 1:
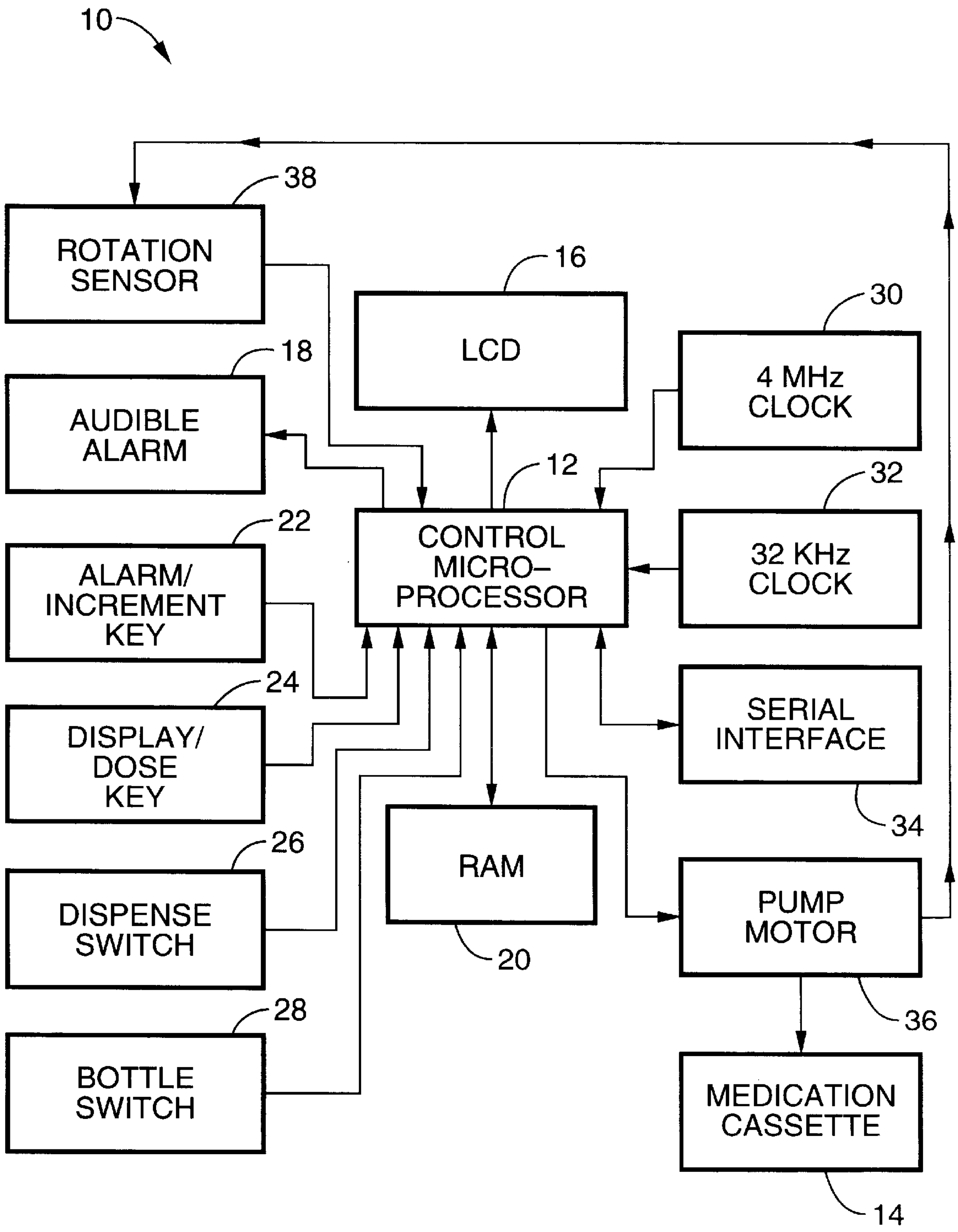
FIG. 1 is a functional block diagram of a liquid dispensing apparatus in accordance with the present invention.

Referring first to FIG. 1, there is shown generally in block diagram form a liquid medication dispenser 10 in accordance with the present invention. Dispenser 10 generally comprises a control microprocessor 12 which provides the overall control functions of the device, including monitoring and recording the number of medication doses dispensed from a medication cassette 14, alerting the user of the time for taking medication dosages, monitoring the amount of medication remaining in the medication cassette 14, and computing a compliance score. User feedback from the device is provided both by a visual display 16 and an audible alarm 18. Memory 20 is provided for storage and retrieval of data, and various keys/switches 22, 24, 26, 28 are provided for user and/or general operation. Timing and clock operations are provided by a pair of clocks 30, 32. A serial interface 34 is also provided for linking the device to an external computer. Liquid medication is dispensed by operation of pump motor 36 which is mechanically coupled to the medication cassette 14. A rotation sensor 38 monitors shaft rotation of pump motor 36 to sense the amount of liquid dispensed.

Figure 2A:
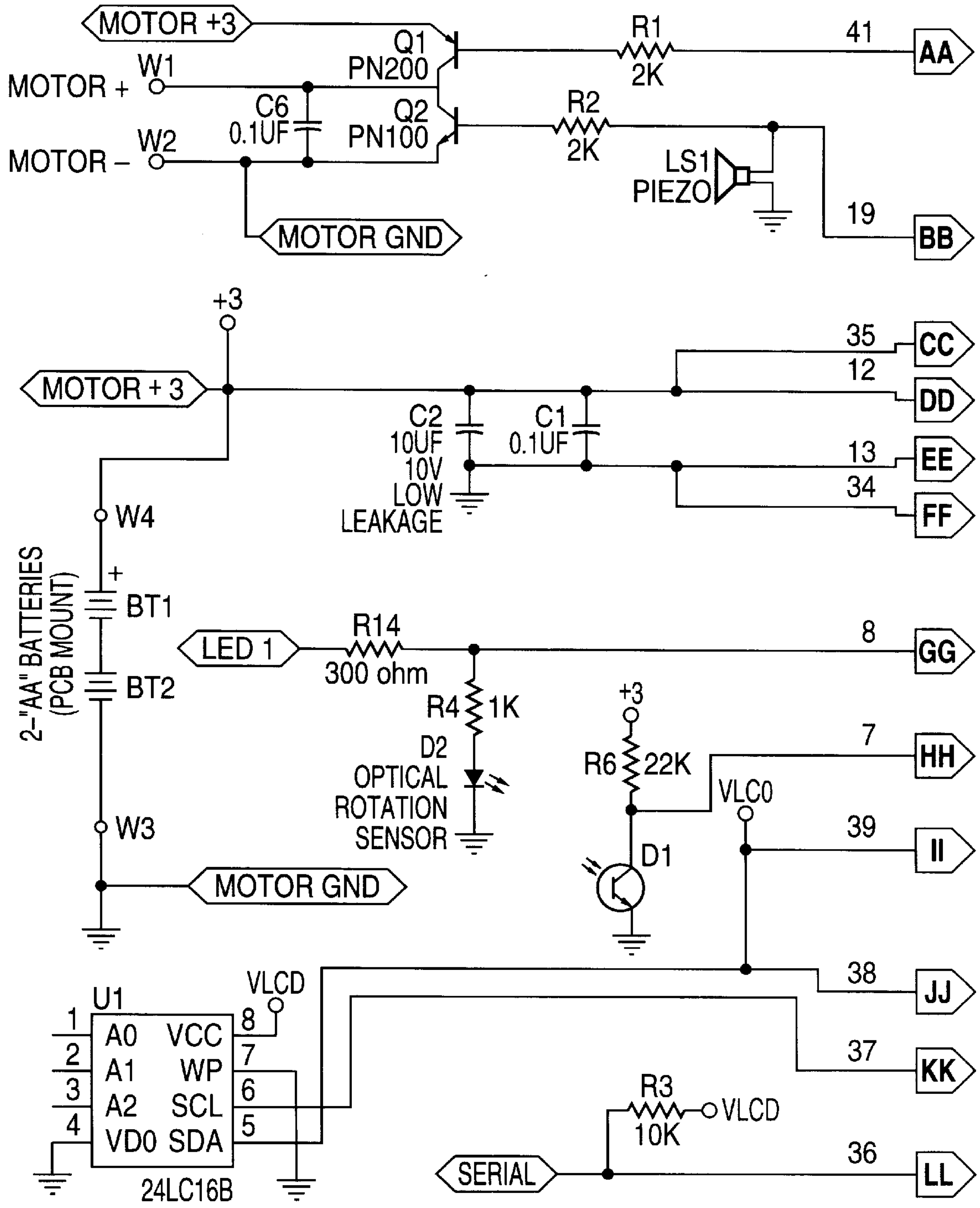
FIG. 2A through FIG. 2C is a schematic diagram of a liquid dispensing apparatus in accordance with the present invention corresponding to the functional block diagram shown in FIG. 1.
Figure 2B:
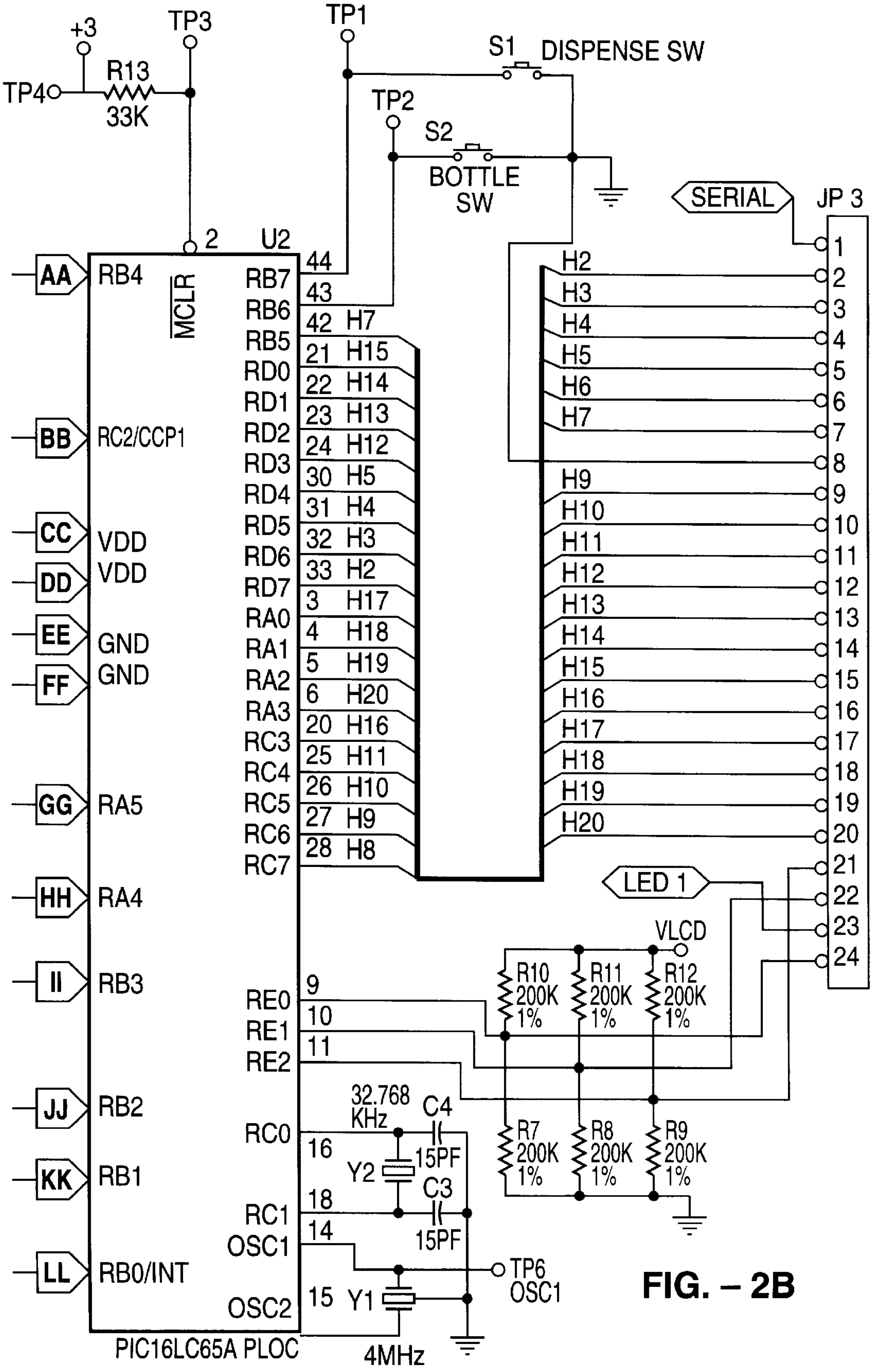
Figure 2C:
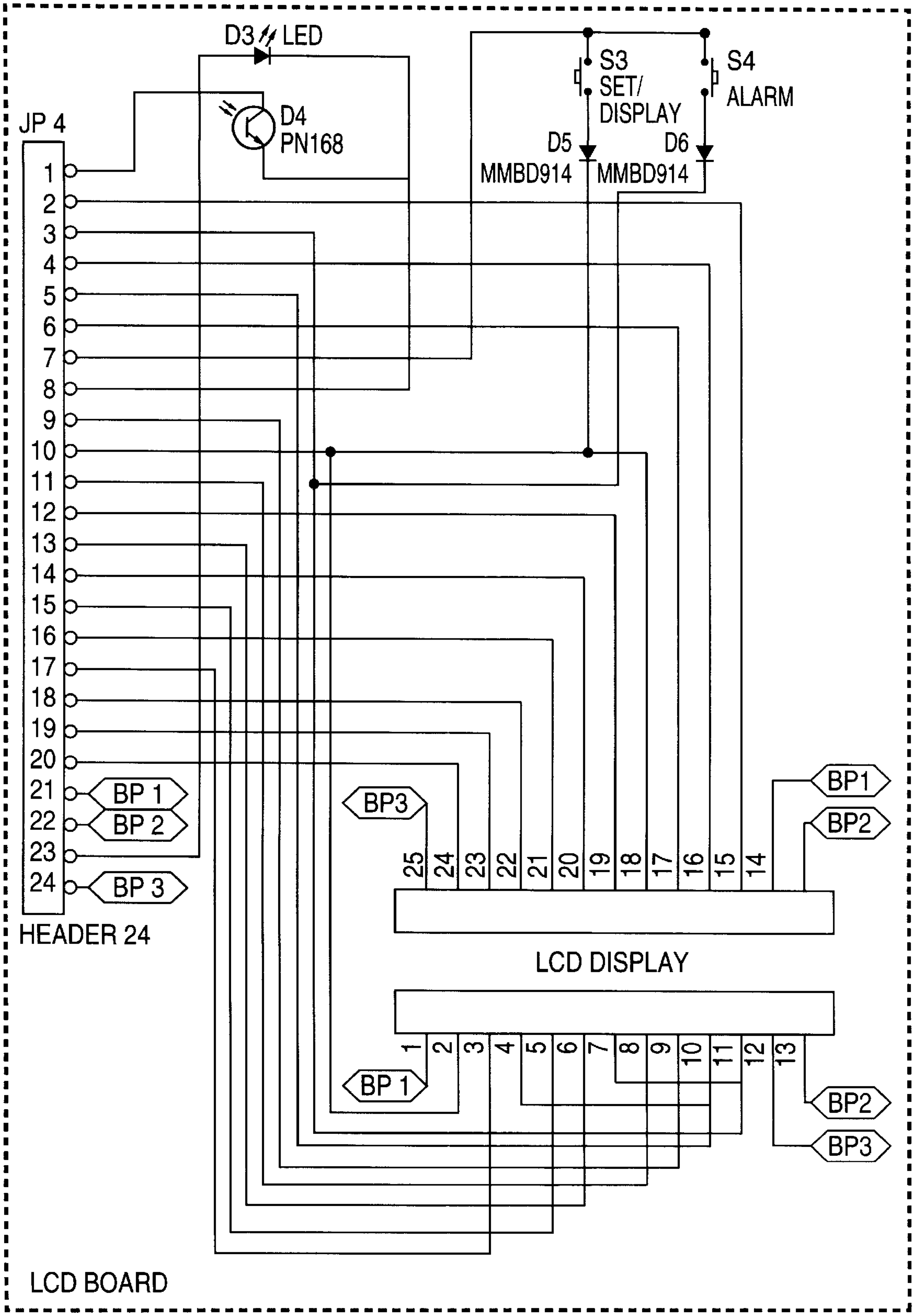

Referring also to FIG. 2A through FIG. 2C, which shows an exemplary schematic diagram corresponding to the control circuitry shown in FIG. 1, control microprocessor 12 preferably comprises a conventional microprocessor, or other programmable data processor, which may be in digital or analog format. In the embodiment shown, control microprocessor 12 comprises a Microchip PIC16LC64A or like device. Pump motor 36 is preferably coupled to control microprocessor 12 by driver in the form of a simple transistor pair wherein one transistor turns the motor on in one direction, and the other transistor shorts out the motor to apply an electronic brake function. Alternative microprocessors which may be used with the invention include National Semiconductor COP842CJ and COP988CS, Microchip PIC16C57, NEC 75304, Motorola 68HC05, Phillips 80C51, Toshiba TMP87CH800LF, Oki MSM64162 and Hitachi micros. Control microprocessor 12 preferably includes a built-in independent watchdog oscillator and timer as conventionally found in such devices. The watchdog timer runs continuously, uses very little power and, if the watchdog timer is not cleared periodically as may occur if the software hangs up for some reason, it will timeout and cause a processor reset. The microprocessor preferably provides flags to differentiate between a watchdog reset and a power up reset, allowing the software to simply continue if a failure occurs. Thus, the clock and other current data is not lost or corrupted.

Display 16 is preferably a conventional commercial grade multi-field liquid crystal display (LCD) with a reflective viewing mode, a 12-o'clock view angle, and a multiplexed electrical drive. Preferably display 16 is software driven directly from the pins of control microprocessor 12 to reduce circuit board space and the number of solder joints required. Alternatively, display 16 could be driven using a conventional driver circuit, either internal or external to control microprocessor 12. However, microprocessors with LCD drivers tend to increase cost.

Audible alarm 20 preferably comprises a conventional small, low-cost, low power piezoelectric element that can be used to generate alarms in the form of high frequency tones in the range of 3 to 4 KHz. The device is similar to those used in watches with alarms and small clocks.

For storage of important data, memory 20 preferably comprises non-volatile random access memory (RAM) or the like, which allows the batteries to be changed or power disturbances to occur without loss of data or clock time. The preferred memory is a conventional 2K EE memory chip such as the Microchip 24LC16B, which operates in a low voltage range. Memory internal to the particular microprocessor selected may alternatively be used.

Timing functions are carried out by two time-base clocks. For the microprocessor shown in FIG. 2, clock 28 is preferably a 4 MHz clock that is used for basic processing when the microprocessor is awake. On the other hand, clock 30 is preferably a 32 KHz clock that runs continuously to provide a time base for a real time ten minute clock. By stopping the faster 2 MHz clock most of the time, substantial battery power is saved.

Figure 3:
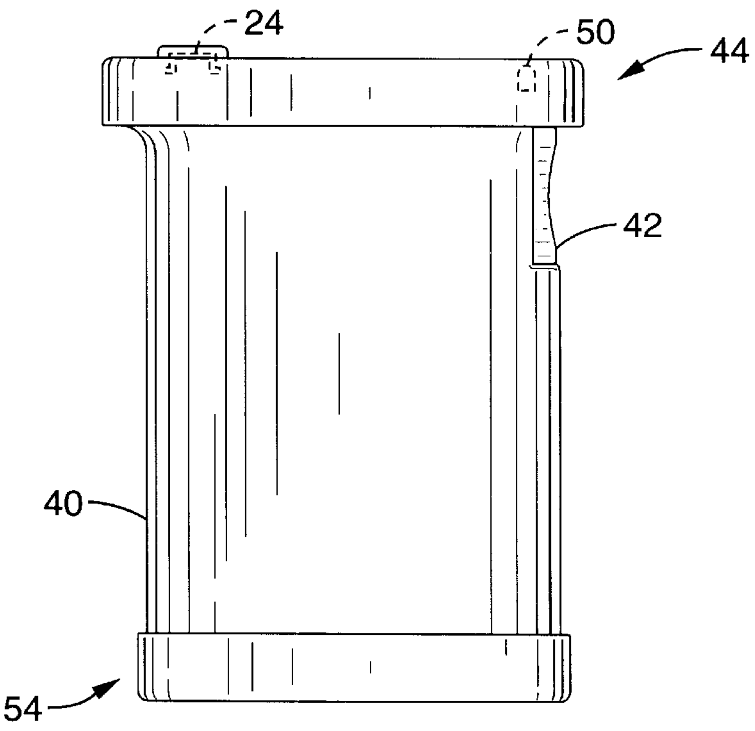
FIG. 3 is a side elevation view of a liquid dispensing apparatus in accordance with the present invention.
Figure 4:
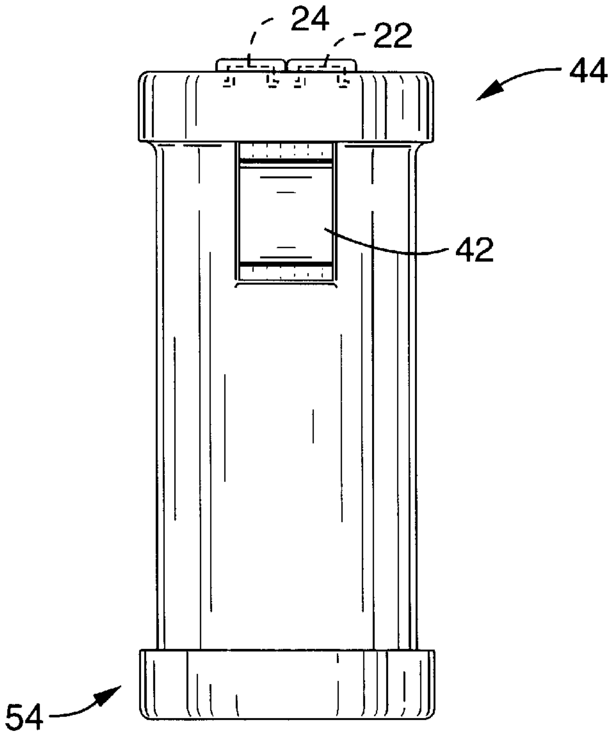
FIG. 4 is a front elevation view of a liquid dispensing apparatus in accordance with the present invention.
Figure 5:
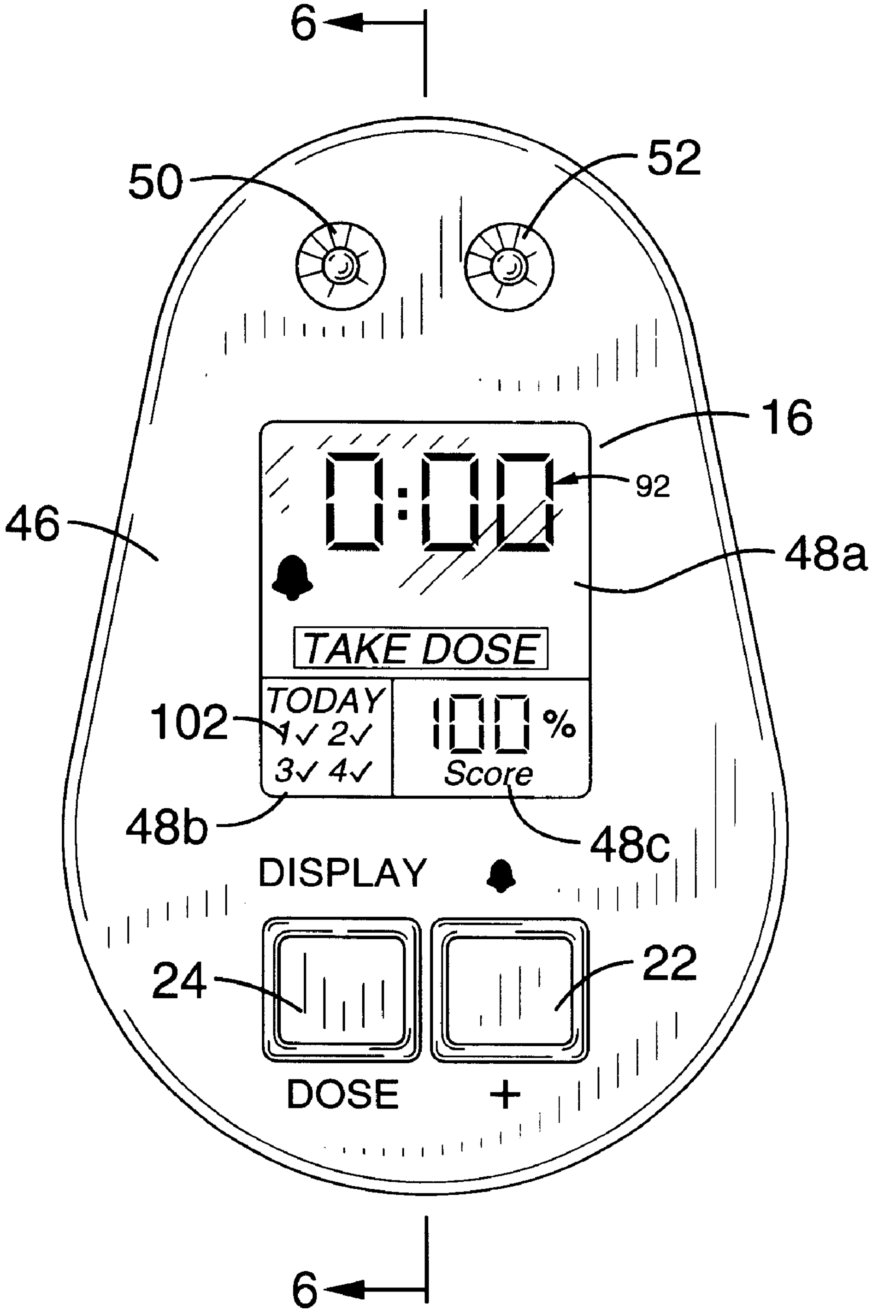
FIG. 5 is a top plan view of a liquid dispensing apparatus in accordance with the present invention.

Referring also to FIG. 3 through FIG. 5, a hand-held housing 40 contains the functional components of dispenser 10. Housing 40 includes a physical dispense trigger 42 which operates dispense switch 26 (FIG. 1 and FIG. 2B).

Referring more particularly to FIG. 5, the upper portion 44 of housing 40 includes a user control panel 46. Control panel 46 includes display 16, which has three viewing segments 48*a*, 48*b*, 48*c*. Control panel 46 also includes alarm/increment key 22, display/dose key 24, a "take dose" alarm light 50 which is a conventional light emitting diode (D3 in FIG. 2B), and a conventional phototransistor 52 (D4 in FIG. 2B). Liquid medication is dispensed through the lower portion 54 of housing 40.

Note that alarm light 50 also functions as the emitter portion of serial interface 34, while phototransistor 52 functions as the receiver portion of serial interface 34. Alternatively, a dedicated light could be used for alarm light 50 and serial interface 34 could comprise a conventional infrared transceiver mounted in the case of dispenser 10. In any of these embodiments, to communicate with a personal computer (PC) or the like an interface cable (not shown) is used. The interface cable preferably has an infrared transceiver in a small housing on one end, and either a 9 pin or 25 pin serial connector on the other end. The housing on the interface cable would be adapted to fit over housing 40 so that the infrared transceiver can be positioned adjacent to emitter 50 and receiver 52. Conventional communications timing and command protocol is then used for communications. It will be appreciated that other conventional communications means could be employed, including serial cables that plug into dispenser 10, modems, telephone links, radio links, printer connections and the like.

Figure 6:
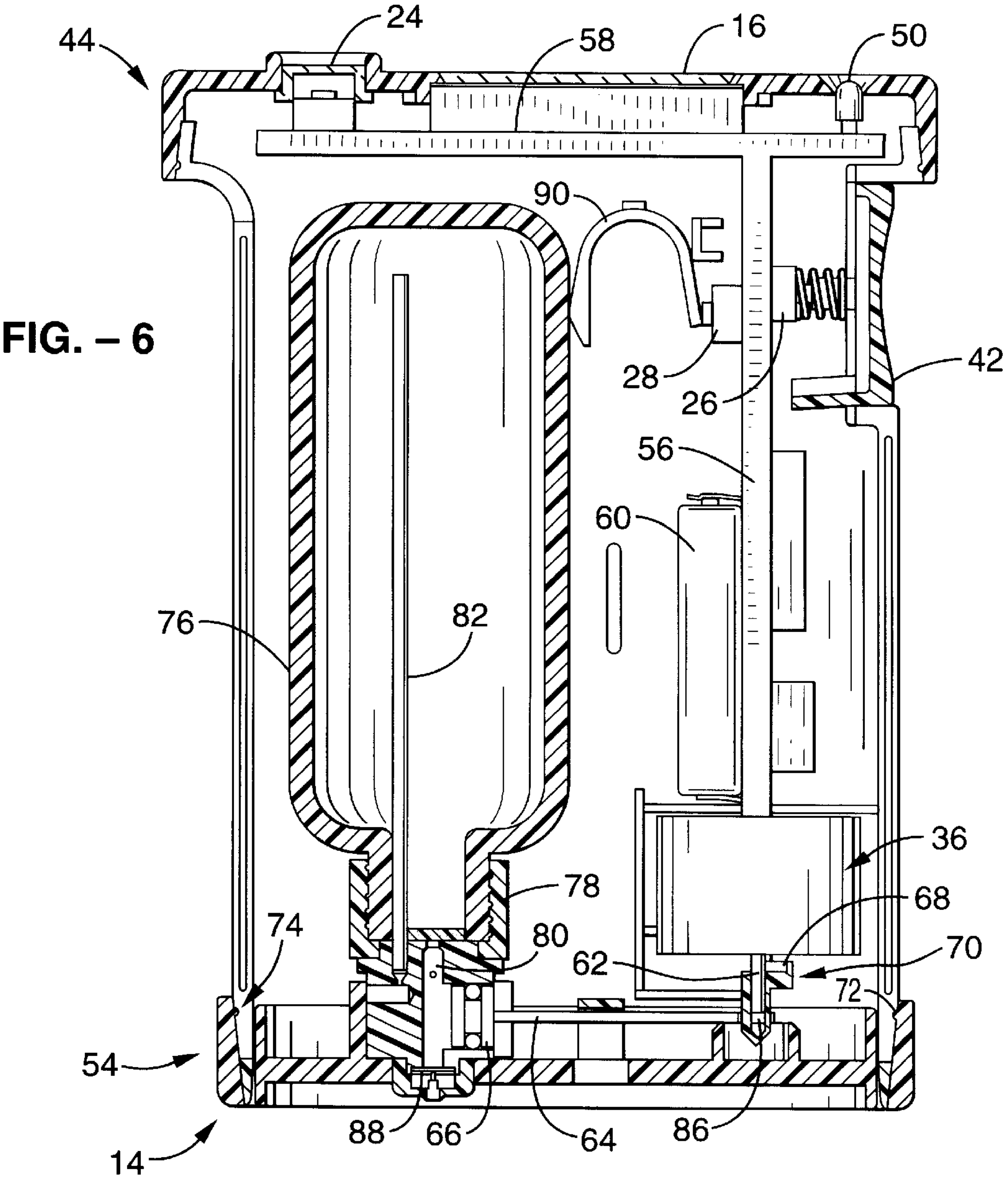
FIG. 6 is a cross-sectional view of a liquid dispensing apparatus in accordance with the present invention taken through line 6—6 showing the disposable cassette assembly in place with a liquid medication bottle attached.

Referring to FIG. 6, dispenser 10 is preferably constructed on two printed circuit boards (PCB) 56, 58. PCB 56 carries most of the electronic components while PCB 58 primarily carries display 16. Display 16 is preferably connected to control microprocessor 12 and related components through a flexible connector or the like (not shown) and is preferably mounted at a right angle to PCB 56. Alternative configurations could also be used.

Dispenser 10 is preferably powered by one or more batteries 60 such as "AA" alkaline. "AAA" alkaline, or "2/3 A" lithium batteries. Various other batteries, such as 9 volt versions, button cells, etc. may alternatively be used. Generally, consideration must be given to the voltages required by the microprocessor used with the invention, the life of the battery with a given electronic configuration, and constraints on size, cost, and replacement availability. The alkaline cell batteries are presently preferred due to their low cost, long life, and correct voltage for the microprocessor.

Rotation sensor 38 preferably comprises an optical sensor that senses each revolution of shaft 62 of pump motor 36. Shaft 62 is in turn coupled to a connecting rod 64 that operates a pump piston 66 in medication cassette 14. This in turn senses each stroke of pump piston 66 during dispensing. The output from rotation sensor 38 is used by control microprocessor 12 to monitor the medication doses dispensed and to calculate the remaining doses in medication cassette 14. The optical sensor preferably comprises a half-moon shaped disk 68 coupled to shaft 62 that interrupts the light path between a conventional optical emitter/sensor pair 70 (D1, D2 in FIG. 2A) during rotation of shaft 62. It will be appreciated that magnetic rotational sensors or other techniques could be used as alternatives to optical emitter/sensor pair 70.

Figure 7:
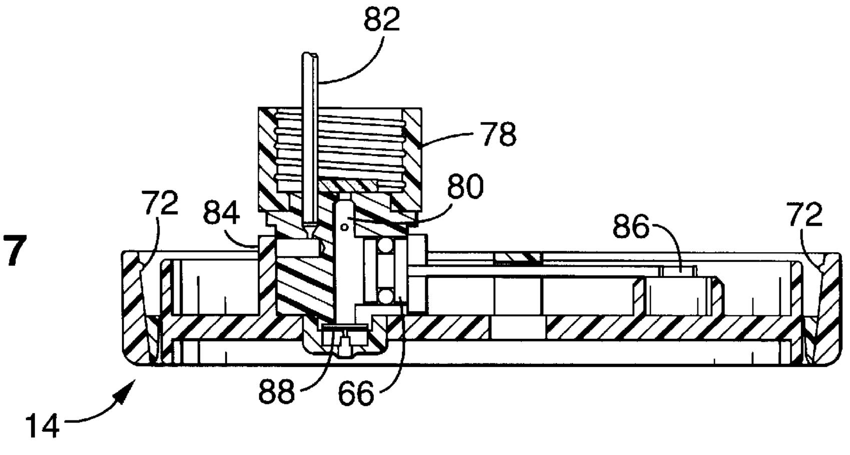
FIG. 7 is a partial cross-sectional view of the disposable cassette assembly portion of FIG. 6 with the liquid medication bottle removed.

Referring also to FIG. 7, medication cassette 14 comprises a removable assembly that snaps into the bottom portion 54 of housing 40 by means of a resilient latch 72 that engages a corresponding slot 74 in housing 40. Medication cassette 14 includes a liquid medication bottle 76 or like reservoir for storage of the medication to be dispensed. The size of liquid medication bottle 76 is preferably approximately 50 ml, which is a standard size. Liquid medication bottle 76 screws into a receptacle 78 where it is secured in place and positioned adjacent to pump orifice 80. An air vent tube 82 coupled to a hydrophobic vent 84 is provided for extending into liquid medication bottle 76 to assist with pumping operation. Connecting rod 64 is coupled to shaft 62 of motor 36 by means of a reciprocating crank 86 for operation of pump piston 66, and liquid medication is dispensed through a flapper valve 88. Bottle switch 28 (FIG. 1, FIG. 2B) is toggled by a switch lever 90 that contacts liquid medication bottle 76 whenever medication cassette 14 is installed or removed.

Figure 8:
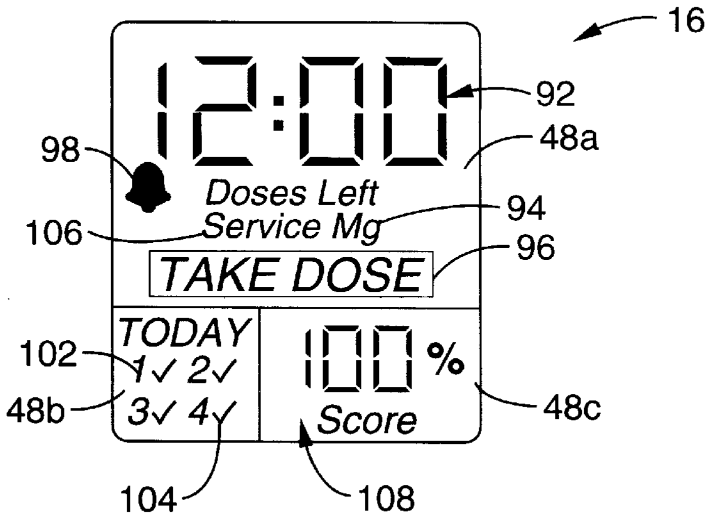
FIG. 8 is a diagrammatic view of a basic screen display in accordance with the invention showing three viewing fields.
Figure 9:
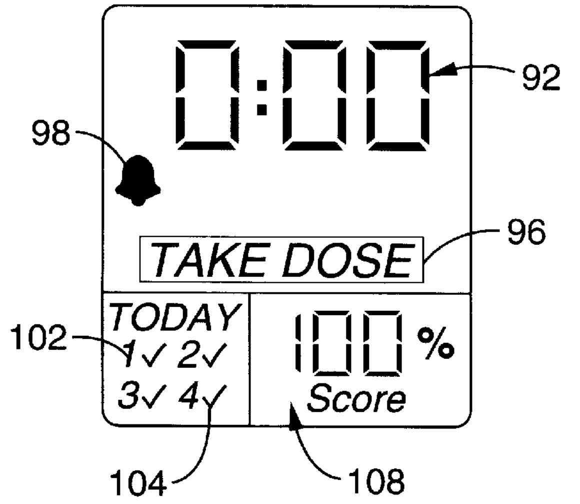
FIG. 9 is a diagrammatic view of a second screen display in accordance with the present invention.
Figure 10:
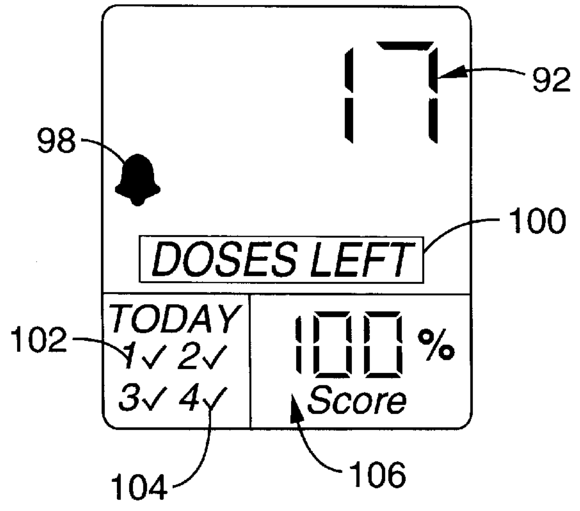
FIG. 10 is a diagrammatic view of a third screen display in accordance with the present invention.

Referring also to FIG. 8 through FIG. 10, dispenser 10 generally operates in accordance with the following criteria.

1. Alarm and Timer Functions

Dispenser 10 includes alarm and timer functions which provide a simple reminder to the patient to take medication regularly. These reminders comprise a count down timer, dose size indicator and visual and audible prompts. FIG. 8 shows the basic screen display configuration for dispenser 10, where an upper digit set 92 is shared between a count down timer value, doses left value, and dose size value. Pressing the display/dose key 24 will toggle through these displays.

The count down timer is displayed in hours and minutes and represents the time until the next dose. It is started each time a dose is dispensed with a time value programmed by the health care provider. The count down timer is not visible when dispenser 10 is in a power saving sleep mode, but the time value is maintained continuously in memory. The count down timer value is displayed whenever dispenser 10 is awakened from the sleep mode or when the count down timer counts down to zero signaling that it is time to take a dose.

The dose size value is an integer number in milligrams that is programmed by the health care provider and displays the dose size along with an "mg" icon 94 to shown the amount of liquid medication to be dispensed. The count down timer and dose size values are also displayed during the last hour prior to the dose time, alternating between each other approximately every three seconds. In addition, if dispenser 10 is in a sleep mode it can be awakened by pressing any key, and the count down timer will display until dispenser 10 goes to sleep again or until the display/dose key 24 is pressed to toggle to another screen display. Those skilled in the art will appreciate that other display parameters could easily be programmed into the apparatus.

When the time value counts down to zero as shown in FIG. 9, the "Take Dose" icon 96 begins to flash on display 16, an audible tone is heard from alarm 18 (FIG. 1, FIG. 2A), the take dose light 50 (FIG. 5) flashes, and an alarm icon 98 flashes. Until the dose is taken, the visual indicators continue to flash and the audible tone repeats once every 10 minutes. Note that the patient may take the dose at any time, and the count down timer will not prevent early dose taking. Note also that the alarm can be toggled on and off by depressing alarm/increment key 22.

2. Dosage Dispensing

To dispense a dose of medication, the patient holds dispenser 10 over a drinking cup or other container. Dispense button 42 (FIG. 3, FIG. 4) is then pressed and held depressed for one to two seconds until a audible prompt is heard. Dispense button 42 is then released to start the dispense action. For safety, dispense button 42 must preferably be released within one second or dispensing action will occur. This timed interaction will help prevent accidental dispensations of medication that might occur from moving or bumping dispense button 42. Alternatively, a safety latch or locking mechanism could be employed instead of the foregoing press and release mechanism. Once started, dispenser 10 will always dispense the programmed volume of medication. Dispenser 10 will then sound a completion tone at the end of the dose.

After the dose, digit set 92 will automatically display the integer number of doses left and a "Doses Left" icon 100 will appear as shown in FIG. 8. If no other keys are pressed, dispenser 10 will automatically go to sleep after a preset timeout period. Additionally, once a dose is dispensed, for safety and compliance purposes a subsequent dose cannot be dispensed until after a preset time period elapses as determined by an internal timer. That time period can, if desired, be set short of the next dose time; doing so will permit the patient to take the next dose earlier than scheduled if desired, but not so early that the patient will overdose. Alternative, the timer can be disabled altogether, thus overriding this protection.

3. Dosage Display Icons

The invention displays the doses to be taken in a given day in viewing segment 48*b* of display 16 as shown in FIG. 8. The dose number is displayed as an integer value 102, and a check mark 104 is used to identify each dose taken in a twenty-four hour period since 1 AM. Therefore, the display will be in the form of "1√", "2√" and so forth for doses taken. The check marks are cleared at 1 AM of each day, and each dose causes another icon to light (whenever the display is awake). Up to four doses can be prescribed per day, and FIG. 8 through FIG. 10 show the display format after four doses have been taken.

4. Setting Dosages

The dose size is initially set by the health care provider using a personal computer coupled to serial interface 34. The dose sizes can be set in 0.1 ml increments from 0.1 ml to 5.0 ml. Display 16 shows this value in terms of milligrams at a rate of 100 mg per milliliter.

Referring also to FIG. 5, the patient can change the dose size by pressing and holding the display/dose key 24 and the alarm/increment key 22 together for approximately three seconds. Any other sequence will abort the change. Display 16 will then automatically switch to show the dose size, the "mg" icon 94 will flash, and an audible tone will be heard. While the display/dose key 24 is held down, the alarm/increment key 22 is then pressed repeatedly to increment the dose size to the desired amount in 10 mg steps. The value will wrap from 500 mg back to 10 mg and then repeat the 10 mg incremental steps for a total of fifty steps. While changing the dose size, pressing and holding the alarm/increment key 22 will automatically increment the value about two or three steps per second. The dose size is incremented in a temporary register during this procedure.

Referring also to FIG. 10, an example of a display screen showing the number of doses left in medication cassette 14 can be seen. The actual volume drawn from medication cassette 14 is maintained internally and the remaining doses at the current dose size is computed and displayed. Since the starting volume and dose sizes are known, the remaining doses are easily determined. Preferably, the starting volume is divided by the dose size to determine the total number of doses available, and then the number of dispensed doses subtracted from the starting number. Alternatively, the volume of dispensed doses could be subtracted from the starting volume, and the remaining volume divided by the dose size to determine the remaining number of doses. No dose will be dispensed and an audible alarm will sound if there is insufficient medication to give a full dose. The dose size and doses left icon 100 are always shown after a dose is taken.

5. Cassette Removal Alarm

An audible alarm is sounded if medication cassette 14 is removed with more than 6 ml left in bottle 76. When medication cassette 14 is replaced, the supply counter will be retained at its previous value. This sequence presumes that medication cassette 14 was removed for inspection only, and reinstalled partially full. For this sequence of early removal and re-installation, the number of doses left and the doses left icon 100 will flash until medication cassette 14 is replaced. However, if the user presses the display/dose key 24 during the first five seconds after removal of medication cassette 14, the counter will reset back to 50 ml. This is an override of the default value, allowing early cassette replacement by a properly instructed user or health care provider.

If medication cassette 14 is changed with less than 6 ml left, the counter will reset back to 50 ml, assuming a normal new cassette replacement. The user should be instructed not to remove the cassette until the doses left value in display 16 indicates one or zero doses and to install only full medication supply bottles.

6. Compliance Memory

Dispenser 10 preferably includes sufficient non-volatile memory in RAM 20 to maintain a compliance history of up to approximately nine hundred and fifty doses being dispensed. Two doses per day results in over fifteen months of compliance history, and three doses per day results in over ten months of compliance history. Each dose is recorded as a time event with a resolution of ten minutes and a maximum time span of fifteen months, based on the internal clock as set by the health care provider, patient or other user via a personal computer and serial interface 26. The actual values stored must be interpreted by the personal computer software upon downloading to establish actual days and months.

In addition to storing the time of each dose dispensed, the compliance memory also stores the dose sizes. To save memory, it only stores a new dose size in the compliance memory when the health care provider, patient or other user changes it. The values stored range from one to fifty, corresponding to 10 mg to 500 mg. Changing the dose size uses the equivalent of one time recording, reducing the maximum number of doses recorded by one for each change. Even in unusual cases where the dose changes frequently, this should not impact the usefulness of the product.

Optionally, the compliance memory could also store the time of each any medication supply change to confirm correct usage of each supply.

If the compliance memory has thirty or less memories available, the "service" icon 106 shown in FIG. 8 will flash on the display and an audible alarm will sound after each dose is taken.

7. Compliance Score

Dispenser 10 also keeps a running history of the number of doses taken each day for a compliance score period; for example, thirty days. From that history, it computes a percentage of compliance from the number of prescribed doses versus the actual number taken. Referring to FIG. 8, this value is then displayed as a score 108 in viewing segment 48*c* of display 16 for monitoring. The compliance score is updated as a function of time and dosing, and changes if dosing does not occur on specified times or at specified does. The values are in increments of 1% steps, so score steps include 0% through 100%. Note that this information is maintained in a separate portion of RAM 20 than the compliance memory for computation purposes, but can also be cleared independent of the compliance memory. As a result, a patient's score can continue uninterrupted even after uploading the compliance data.

In order to determine the compliance score, when a dose is taken the "today's dose" count is incremented, up to a maximum of four doses per day. At 1 AM of each day, the dose count is set to zero. Where the compliance score is computed over a thirty day running period, the past thirty days of counts are summed and the total days are counted. If the total number of days counted is less than five, the count is forced to five so that a 100% compliance score is not reached until five days of medication. The compliance score is then computed according to:

Score=(sum of doses)/(doses per day * total day count)

and rounded to the nearest 1% increment.

As can be seen, the compliance score is a critical indicator that the patient, health care provider or other person responsible for monitoring treatment can use to determine if proper drug therapy is taking place.

8. General Memory

Dispenser 10 also includes general memory in RAM 20 that allows programming of the patient name or identification (30 characters), the pharmacy name or identification (30 characters), the device serial number (10 characters), the last date and time that the unit was programmed, the number of doses per day prescribed, and time interval presets (useful when 3 or 4 doses per day are prescribed).

9. Internal Clocks

Dispenser 10 maintains a real time clock that is set via a personal computer and serial interface 26. It does not regard date or months or time changes. It simply counts up every ten minutes to a maximum count of 65,530, or 10,922 hours, or 455 days. The time of day for day zero is recorded upon programming. It is used to establish when the day rollover occurs to reset the "doses today" check marks 104.

When data is uploaded to a personal computer via the serial interface 26, the personal computer receives the current real time clock value from dispenser 10 and computes actual days and times with this real time clock value relative to the real time and date from within the personal computer. To establish the actual time and date of a particular dose, the dose time is subtracted from the current real time clock value to determine how much time has elapsed since the dose. The elapsed time is then used to determine an actual calendar date and time within the personal computer. This ten minute clock is kept in non-volatile memory, so a battery power loss due to a drop, bump, or the patient changing the battery will not result in a full reset of the clock or confusion within the compliance data. Optionally, when the clock is at a predetermined number of days, such as three hundred and sixty-five days, or greater since a service by the health care provider, the service icon 106 will flash on the display and an audible alarm will sound after each dose is taken.

10. Sleep Mode and Timeout

Dispenser 10 enters a sleep mode when not in use between doses to save battery power. During that time, display 16 is blank and the only internal activity is clock maintenance. Pressing either the alarm/increment key 22 or the display/dose key 24, or removing medication cassette 14, will wake up dispenser 10 and activate display 16. Also, one hour prior to the time for dosing, dispenser 10 will automatically wakeup and activate display 16. Dispenser 10 will go back to sleep after two minutes of non-activity, termed the sleep "timeout" period.

11. Programming and Uploading Data

The health care provider would generally run a software program on an external personal computer to communicate with dispenser 10 for programming and reading the compliance history. To enter the communications mode, the alarm/increment key 22 is held down for three seconds until display 16 goes blank. This indicates that dispenser 10 is ready to talk to the personal computer. The software on the personal computer is then run (or the correct function activated within software that is already running). The personal computer then transmits various commands to dispenser 10 and establishes communications. When all communications are finished, pressing dispense button 42 (which in turn activates dispense switch 26) causes dispenser 10 to exit the communications mode and return to normal operation. Preferably, the communications mode operates with the following safeguards:

(a) The communications mode cannot be entered if dispenser 10 is in the process of setting a dose or dispensing a dose.

(b) The alarm/increment key 22 does not need to be held down during communications.

(c) The internal clocks are suspended during the communications mode.

The personal computer always acts as the master and issues commands to either read data from or write data to dispenser 10. A complete data transfer will take approximately four to twenty seconds, depending upon the amount of data transferred. Simply programming dispenser 10 will be almost instantaneous since little data is transferred. For compatibility, a data rate of 2400 baud is used.

12. Programming Command Set

Control microprocessor 12 includes programming which will generally carry out the operations of:

(a) Programming patient name and identification (ID).

(b) Programming pharmacy name and ID.

(c) Programming serial number (only used in production).

(d) Resetting real-time clock to current time, day zero (10 minute clock).

(e) Programming the dose size.

(f) Programming doses per day (one to four).

(g) Programming dose intervals (4 two digit hours values. ex: 04,04,04,12).

(h) Resetting the battery timer (new battery installed).

(i) Clearing the compliance history memory.

(j) Clearing the compliance score memory (30 day histogram data).

(k) Reading data: This operation includes reading the compliance memory of all doses taken since compliance memory was last cleared (time for each dose and all dose sizes used), patient and pharmacy names and ID's, device serial number, battery life timer, current real time clock, and time value when unit was last programmed. All data is uploaded at one time, allowing the personal computer to be used to further manipulate the data for displaying and/or printing.

13. Battery Change Timer

To save power and cost, dispenser 10 preferably does not utilize a battery voltage detector. Instead, it senses when the battery is removed and starts a timer when the new battery is installed. After a preset period of time (e.g., six months) or after a certain number of dispenses since a battery change, service icon 106 (FIG. 8) will light anytime the unit is awake. Note that this timer is independent of the clock. This timer value can also be read by a personal computer over serial interface 26 so the health care provider can view it.

As a routine, the health care provider should change the batteries regularly, even if the battery timer has not timed out, to insure reliable operation.

14. Replacing the Medication Cassette

The empty medication cassette 14 is removed from dispenser 10 by squeezing the two side latches 74 (FIG. 6) at the bottom portion of dispenser 10 and removing the entire medication cassette 14. This includes the liquid medication bottle 76 and disposable fluid path components. To load a new medication cassette 14 into dispenser 10, the cassette assembly is inserted into dispenser 10 until the two side latch assemblies 72, 74 engage.

Medication cassette 14 is assembled using a standard bottle of the medication and a disposable fluid path assembly. The medication cassette is automatically primed during the first dose after it is installed, eliminating any pre-priming by the health care provider or the patient. The accuracy of the priming action may introduce a small degree of error on smaller doses, and compensation may be necessary. Note that if medication cassette 14 is removed and then reinstalled, the first dose administered will be over-dosed by the priming volume, which is in the range of approximately 0.1 ml to 0.2 ml.

15. Possible Hazards Overcome by the Invention

Table 1 lists various hazards or dangers associated with the taking of medications, and indicates how the present invention overcomes or avoids these hazards. Preferably, a user manual is provided with the invention which explains the solution provided by dispenser 10. The "level of concern" column shown in Table 1 corresponds to the FDA's definitions regarding the potential harm done to a patient. In all hazard cases, the mitigated level of concern is reduced to MINOR CONCERN, causing little or no harm to the patient.

Accordingly, it will be seen that this invention provides a liquid medication dispenser which alerts patients of the correct time intervals for taking liquid medications, which keeps track of and displays the number of dosages of liquid medication taken, which quickly, consistently and accurately measures and dispenses dosages of liquid medication in a user friendly manner, and which records the date, time and dose level so that treatment compliance can be reviewed by the patient and/or healthcare professional supervising the treatment. The invention is particularly suited for immunosuppressive therapy in transplant patients. Using an immunosuppressive drug such as cyclosporine, tacrolimus, mycophenolate mofetil, mycophenolate acid, raapamycin or azathioprine, steroids, leflumomide, on a daily basis (e.g., once, twice or four times a day) at the appropriate dose is essential to transplant outcome. Insufficient dosing can result in acute graft rejection and graft loss. Excessive dosing can result in nephrotoxicity, liver toxicity, infectious cancer or neurotoxicity. Patients need specific education and monitoring; they typically have three to ten medications per day to use on a chronic basis. Measuring compliance, or lack of compliance, can help healthcare professionals to better direct their education and monitoring efforts toward certain patients.

Although the description above contains many specificities, these should not be construed as limiting the scope of the invention but as merely providing illustrations of some of the presently preferred embodiments of this invention. Thus the scope of this invention should be determined by the appended claims and their legal equivalents. In addition, those skilled in the art will appreciate that various forms of circuitry can be used for the invention, and that the schematic diagram shown in FIG. 2 is but one embodiment that could be employed. For example, circuit elements could be replaced with digital or analog equivalents. Furthermore, it will be appreciated that control microprocessor 12 and its associated programming and relate components provides the means for carrying out the timing, recording and dose tracking functions, and related computations described above, as well as control of medication cassette 14 and communications with external devices such as a personal computer. Also, the programming sequences and steps for control processor 12 can vary without departing from the scope of the invention. Those skilled in the art will appreciate that conventional programming techniques would be employed to implement the functions described herein with respect to remotely programming and interrogating dispenser 10 with an external personal computer. The design and coding of such software to carry out those functions could be readily developed by a person having ordinary skill in the art and, are not described herein.

| Potential Hazard | Level of Concern | Potential Cause | Solution Provided by the Invention |
|---|---|---|---|
| Dose too Small | Moderate | Incorrect dose size programmed by PC. | The actual dose size is always displayed prior to dispensing. The dose size is initially programmed by a professional pharmacy. The patient is instructed to observe the dose size. |
| | | Incorrect dose size programmed by patient. | The actual dose size is always displayed prior to dispensing. The patient is instructed to observe the dose size. |
| | | Patient does not allow complete dispense into glass. | Patient is instructed on use of the device when issued. The instruction manual contains the same instructions. Housing 40 can include an arrow (not shown) indicating the dispense location on the bottom to insure the medication goes into the glass. |
| | | Disposable pump not properly mated to motor cam | The disposable and motor cam are designed to self-fit, provided the disposable fluid path is fully inserted. The software monitors the proper insertion of the medication supply and will not dispense and will cause an alarm if not properly inserted. |
| | | Medication supply goes empty during dispense. | The software maintains a record of the quantity of medication left in the medication cassette and will not dispense and will cause an alarm if there is insufficient solution in the supply. |
| | | Fluid path not primed | The dispenser automatically primes the fluid path with the first dispense after changing the medication cassette. |
| | | Electronic failure | The electronics use a full time watchdog to reset the micro upon program failure. The software uses timeouts to insure that the motor is rotating and alarm if there is a motor failure. |
| No dose delivered | Moderate | No medication supply present or not inserted fully. | The software monitors the proper insertion of the medication supply and will not dispense and will cause an alarm if a dispense is attempted when the supply is not present or not fully inserted. |

-continued

| Potential Hazard | Level of Concern | Potential Cause | Solution Provided by the Invention |
|---|---|---|---|
| | | Medication supply empty | The software keeps a record of the remaining medication supply and will not dispense and will cause an alarm if a dispense is attempted when the record indicates an empty supply. |
| | | Disposable pump not properly mated to motor cam | The disposable and motor cam are designed to self-fit, provided the disposable fluid path is fully inserted. The software monitors the proper insertion of the medication supply and will not dispense and will cause an alarm if not properly inserted. |
| | | Battery too low for operation | The software detects when the battery has been removed and times the total operation time since the new battery was inserted. An alarm is given on the display when the battery has been in place for 365 days. The actual expected battery life is longer than this, insuring correct operation for the full time. In addition, the user's manual instructs both the health care provider and the patient to only replace the batteries with new ones. |
| Dose too big | Moderate | Incorrect dose size programmed by PC | The actual dose size is always displayed prior to dispensing. The dose size is initially programmed by a professional pharmacy. The patient is instructed to observe the dose size. |
| | | Incorrect dose size programmed by patient | The actual dose size is always displayed prior to dispensing. The patient is instructed to observe the dose size. |
| | | Electronic failure | The electronics use a full time watchdog to reset the micro upon program failure. The software uses timeouts to insure that the rotation sensor is working correctly and alarms if there is a sensor failure. |
| Accidental Dose dispense | Minor | Dispense button accidentally pressed or bumped. | The software requires that the Dispense button is pressed and held for 2 seconds, and then released within 1 second after an audio prompt to validate a dispense request. A latch or lock mechanism could alternatively be used. |
| Doses missed | Minor to moderate | Patient does not dispense dose when prescribed | The device displays a count down timer and alarms when it is time for the patient to take a dose. The device continues to alarm every 10 minutes until the dose is taken. The device also displays a record of the doses taken today and a score of patient compliance within the last 30 days (or other preset period). The compliance memory also provides the health care professional with complete dose taking history for patient counseling. |
| Doses taken too soon | Minor | Patient dispenses early | The count down timer does not instruct the user to take medication until the prescribed time. |
| Dose taken late | Minor | Patient delays dosing | When the prescribed time has elapsed since the last dose, the device alarms every 10 minutes until a dose is taken. |

-continued

| Potential Hazard | Level of Concern | Potential Cause | Solution Provided by the Invention |
|---|---|---|---|
| Remaining supply counter has incorrect value. | Minor | Supply was removed and reinstalled partially filled. | An alarm is sounded if a medication cassette is removed with more than 6 ml left in the bottle. When the cassette is then reinstalled, the supply counter is retained at its previous value. The "Doses Left" display flashes with until the cassette is replaced. If the user presses and holds the display/dose key during the first 5 seconds after removal of the cassette, the counter will reset back to 50 ml. If the cassette is changed with less than 6 ml left, or the Dispenser is allowed to go to sleep, the counter will reset back to 50 ml. The instruction manual shall include a warning not to remove the cassette until the "Doses Left" display indicates on or zero doses and to install only full medication supply bottles. |
| Compliance Memory corrupted | Minor | Electronic failure | The electronic design and battery operation insure minimal memory corruption. The software stores the data in a format whereby data points are not interdependent and a failure will most likely only cause one data point to fail. |
| Health care provider cannot interpret compliance data | Minor | Patient records are not available | The device allows important patient and prescription information to be held within the device memory and is recovered whenever the compliance memory is read. |
| Internal clock stops | Minor to moderate | Electronic failure | The device utilizes a full time watchdog to reset the micro if a clock failure occurs. |
| Dispenser will not operate | Minor | Electronic failure | The device utilizes a full time watchdog to reset the micro if a clock failure occurs. |
| Compliance Memory is full | Minor | Patient has not seen health care provider | When the compliance memory is within 30 doses of being full (about 2 weeks), an alarm is set after each dispense, indicating that the device must be serviced. The compliance memory can hold up to about 15 months of data with a typical prescription. A typical patient will have to see the health care provider for other reasons before this time. The software utilizes a circular memory configuration in the compliance memory. If the memory is full and is not serviced, the software will over write the oldest data points with the newer ones. Thus, only the more recent doses can be read. |
| Clock time wraps back to zero. | Minor | Patient has not seen health care provider. | The device alarms for service after 365 days upon each dispense. If the patient continues to avoid service beyond 455 days, the internal clock and compliance data time values will simply wrap around to zero and start again. The health care provider or the host PC software may have to do some additional interpretation to decipher this. |

What is claimed is:

1. An apparatus for therapeutic drug therapy, comprising:

(a) means for dispensing a plurality of oral doses of a liquid therapeutic drug from a medication container;

(b) means for recording the size of said doses of the liquid therapeutic drug dispensed;

(c) means for recording the dates and times said doses are dispensed;

(d) means for comparing the size of said doses of liquid therapeutic drug dispensed and the dates and times said doses are dispensed with prescribed dosages and prescribed times for dispensing the liquid therapeutic drug and determining a compliance score as a function of said comparison; and (e) means for displaying said compliance score, wherein said compliance score provides a percentage of compliance based on the number of prescribed doses versus the actual number taken, and changes if dosing does not occur at prescribed times or at prescribed dosages.

2. An apparatus as recited in claim 1, further comprising means for monitoring said compliance score.

3. An apparatus as recited in claim 1, wherein said liquid medication contains a hydrophobic drug.

4. An apparatus as recited in claim 1, wherein said liquid medication contains cyclosporine.

5. An apparatus as recited in claim 1, wherein said liquid medication contains an immunosuppressive drug.

6. An apparatus as recited in claim 1, further comprising means for alerting a user that a dose of said liquid medication should be dispensed.

7. An apparatus as recited in claim 1, further comprising means for determining the remaining number of doses in said medication container.

8. An apparatus as recited in claim 7, further comprising means for displaying said remaining number of doses.

9. An apparatus as recited in claim 1, further comprising timer means for preventing a dose of said liquid medication from being dispensed prior to a specified time period after a previous dose has been dispensed.

10. An apparatus as recited in claim 9, further comprising means for overriding said timer means.

11. An apparatus for dispensing liquid medication, comprising:

(a) means for dispensing a plurality of doses of liquid medication from a medication container;

(b) means for recording the size of said doses of the liquid medication dispensed;

(c) means for recording the dates and times said doses of liquid medication are dispensed;

(d) means for comparing the size of said doses of liquid medication dispensed and the dates and times said doses are dispensed with specified doses and specified times for dispensing the liquid medication and determining a compliance score as a function of said comparison;

(e) means for displaying said compliance score, wherein said compliance score provides a percentage of compliance based on the number of specified doses versus the actual number taken, and changes if dosing does not occur at specified times or at specified dosages; and (f) means for monitoring said compliance score.

12. An apparatus as recited in claim 11, wherein said liquid medication contains a hydrophobic drug.

13. An apparatus as recited in claim 11, wherein said liquid medication contains cyclosporine.

14. An apparatus as recited in claim 11, wherein said liquid medication contains an immunosuppressive drug.

15. An apparatus as recited in claim 11, further comprising means for alerting a user that a dose of said liquid medication should be dispensed.

16. An apparatus as recited in claim 11, further comprising means for determining the remaining number of doses in said medication container.

17. An apparatus as recited in claim 16, further comprising means for displaying said remaining number of doses.

18. An apparatus as recited in claim 11, further comprising timer means for preventing a dose of said liquid medication from being dispensed prior to a specified time period after a previous dose has been dispensed.

19. An apparatus as recited in claim 18, further comprising means for overriding said timer means.

20. An apparatus for dispensing liquid medication, comprising:

(a) means for dispensing a plurality of doses of liquid medication from a medication container;

(b) means for displaying the remaining number of doses in said medication container;

(c) means for alerting a user that a dose of said liquid medication should be dispensed;

(d) means for preventing a dose of said liquid medication from being dispensed prior to a specified time period after a previous dose has been dispensed;

(e) means for recording the size of said doses of the liquid medication dispensed;

(f) means for recording the dates and times said doses of liquid medication are dispensed;

(g) means for comparing the size of said doses of liquid medication dispensed and the dates and times said doses are dispensed with specified doses and specified times for dispensing the liquid medication and determining a compliance score as a function of said comparison; and (h) means for communicating said compliance score to a user, wherein said compliance score provides a percentage of compliance based on the number of specified doses versus the actual number taken, and changes if dosing does not occur at specified times or at specified dosages.

* * * * *